US011223066B2

United States Patent
Zhu et al.

(10) Patent No.: US 11,223,066 B2
(45) Date of Patent: Jan. 11, 2022

(54) SOLID-STATE ELECTROLYTE AND METHOD OF MANUFACTURE THEREOF

(71) Applicants: SAMSUNG ELECTRONICS CO., LTD., Suwon-Si (KR); MASSACHUSETTS INSTITUTE OF TECHNOLOGY, Cambridge, MA (US)

(72) Inventors: Yuntong Zhu, Cambridge, MA (US); Zachary Hood, Atlanta, GA (US); Jennifer Rupp, Cambridge, MA (US); Lincoln J. Miara, Lincoln, MA (US)

(73) Assignees: SAMSUNG ELECTRONICS CO., LTD., Gyeonggi-Do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 266 days.

(21) Appl. No.: 16/224,968

(22) Filed: Dec. 19, 2018

(65) Prior Publication Data

US 2020/0044281 A1    Feb. 6, 2020

Related U.S. Application Data

(60) Provisional application No. 62/713,366, filed on Aug. 1, 2018.

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01M 4/131* (2013.01);
(Continued)

(58) Field of Classification Search
CPC ......... H01M 10/0525; H01M 10/0562; H01M 2004/027; H01M 2004/028;
(Continued)

(56) References Cited

U.S. PATENT DOCUMENTS

| 6,884,514 B2 | 4/2005 | Simpson et al. |
| 7,901,658 B2 | 3/2011 | Weppner et al. |

(Continued)

FOREIGN PATENT DOCUMENTS

| CN | 105406118 A | 3/2016 |
| CN | 106374085 A | 2/2017 |

(Continued)

OTHER PUBLICATIONS

U.S. Non Final Office Action issued for U.S. Appl. No. 16/225,068, filed Dec. 19, 2019; dated May 29, 2020; 21 pages.
(Continued)

*Primary Examiner* — Adam A Arciero
(74) *Attorney, Agent, or Firm* — Cantor Colburn LLP

(57) ABSTRACT

A method of manufacturing a solid-state electrolyte including: providing a solvent; dissolving a precursor compound including lithium, a precursor compound including lanthanum, and a precursor compound including zirconium in the solvent to provide a precursor composition, wherein a content of lithium in the precursor composition is greater than a stoichiometric amount; spraying the precursor composition onto a heated substrate to form a film; and heat-treating the film at 300° C. to 800° C. to manufacture the solid state electrolyte, wherein the solid-state electrolyte includes $Li_{(7-x)}Al_{x/3}La_3Zr_2O_{12}$ wherein $0 \leq x \leq 1$, and wherein the solid state electrolyte is in a form a film having a thickness of 5 nanometers to 1000 micrometers.

15 Claims, 6 Drawing Sheets

(51) Int. Cl.
| | |
|---|---|
| *H01M 4/62* | (2006.01) |
| *H01M 4/133* | (2010.01) |
| *H01M 4/02* | (2006.01) |
| *H01M 4/131* | (2010.01) |

(52) U.S. Cl.
CPC ............ *H01M 4/133* (2013.01); *H01M 4/623* (2013.01); *H01M 2004/027* (2013.01); *H01M 2004/028* (2013.01); *H01M 2300/002* (2013.01); *H01M 2300/0028* (2013.01); *H01M 2300/0071* (2013.01)

(58) Field of Classification Search
CPC ... H01M 2300/002; H01M 2300/0028; H01M 2300/0071; H01M 4/13; H01M 4/131; H01M 4/133; H01M 4/62; H01M 4/623
See application file for complete search history.

(56) References Cited

U.S. PATENT DOCUMENTS

| | | | |
|---|---|---|---|
| 8,658,317 | B2 | 2/2014 | Weppner et al. |
| 9,093,717 | B2 | 7/2015 | Sakamoto et al. |
| 9,450,271 | B2 | 9/2016 | Weppner et al. |
| 10,008,742 | B2 | 6/2018 | Holme et al. |
| 2015/0111110 | A1 | 4/2015 | Watanabe et al. |
| 2015/0200420 | A1 | 7/2015 | Holme et al. |
| 2016/0056500 | A1 | 2/2016 | Holme et al. |
| 2016/0133990 | A1* | 5/2016 | Schwanz ........... H01M 10/0525 429/403 |
| 2016/0141108 | A1 | 5/2016 | Inahara |
| 2017/0363928 | A1 | 12/2017 | Cloots et al. |
| 2018/0026299 | A1 | 1/2018 | Son et al. |
| 2018/0138546 | A1 | 5/2018 | Sung et al. |
| 2018/0175446 | A1 | 6/2018 | Nishizaki et al. |
| 2018/0309136 | A1* | 10/2018 | Vieluf ................. H01M 4/0423 |
| 2018/0375151 | A1 | 12/2018 | Gaben et al. |
| 2020/0044282 | A1 | 2/2020 | Zhu et al. |
| 2020/0403269 | A1 | 12/2020 | Zhu et al. |

FOREIGN PATENT DOCUMENTS

| | | |
|---|---|---|
| JP | 2014002965 A | 1/2014 |
| WO | 2018089430 A1 | 5/2018 |

OTHER PUBLICATIONS

Non Final Office Action issued for U.S. Appl. No. 16/225,068, filed Dec. 19, 2018; dated Oct. 19, 2020; 11 pages.

Ashby, D., et al., "Patternable, Solution-Processed Ionogels for Thin-Film Lithium-Ion Electrolytes," Joule, 1, Oct. 11, 2017, pp. 344-358.

Bitzer, M., et al., "Sol-gel synthesis of thin solid Li7La3Zr2O12 electrolyte films for Li-ion batteries," Thin Solid Films, 615 (2016), pp. 128-134.

Shen, C.H., et al., "Electrode and solid electrolyte thin films for secondary lithium-ion batteries," Journal of Power Sources, 68 (1997), pp. 377-380.

Chen, R-J, et al., "Sol-gel derived Li—La—Zr—O thin films as solid electrolytes for lithium-ion batteries," J. Mater. Chem. A, 2014, 2, pp. 13277-13282.

Djenadic, R., et al., "Nebulized spray pyrolysis of Al-doped Li7La3Zr2O12 solid electrolyte for battery applications," Solid State Ionics, 263, 2014, pp. 49-56.

Garbayo, I., et al., "Glass-Type Polyamorphism in Li-Garnet Thin Film Solid State Battery Conductors," Adv. Energy Mater., 2018, 8, 1702265 (14 pages).

Huang, X., et al., "Method Using Water-Based Solvent to Prepare Li7La3Zr2O12 Solid Electrolytes," ACS Appl. Mater. Interfaces 2018, 10, pp. 17147-17155.

Kazyak, E., et al., "Atomic Layer Deposition of the Solid Electrolyte Garnet Li7La3Zr2O12," Chem. Mater., 2017, 29, pp. 3785-3792.

Lee, G., et al., "Fabrication of a stretchable and patchable array of high performance micro-supercapacitors using a non-aqueous solvent based gel electrolyte," Energy Environ. Sci., 2015, 8, pp. 1764-1774.

Rawlence, M., et al., "Effect of Gallium Substitution on Lithium-Ion Conductivity and Phase Evolution in Sputtered Li7-3xGaxLa3Zr2O12 Thin Film," ACS Appl. Mater. Interfaces, 2018, 10, pp. 13720-13728.

Solano, M., "Development of artificial surface layers for thin film cathode materials,"Material chemistry, Université de Bordeaux, 2015, English, submitted on Jun. 7, 2016, 160 pages.

Van Den Broek, J., et al., "Boosting the electrochemical performance of Li-garnet based all-solid-state batteries with Li4Ti5O12 electrode: Routes to cheap and large scale ceramic processing," J Electroceram (2017), 38, pp. 182-188.

Wang, B., et al., "Sol-gel-derived amperometric biosensor for hydrogen peroxide based on methylene green incorporated in Nafion film," Talanta, 51 (2000), pp. 565-572.

NIST URL: hhtps://www.nist.gov/pmi/weights-and-measures/si-units-temperature (Year: 2010) 7 pages.

U.S. Final Office Action issued for U.S. Appl. No. 16/225,068, filed Dec. 19, 2018; dated Mar. 15, 2021; 22 pages.

* cited by examiner

SOLID-STATE ELECTROLYTE AND METHOD OF MANUFACTURE THEREOF

CROSS-REFERENCE TO RELATED APPLICATION

This application claims priority to U.S. Provisional Patent Application No. 62/713,366, filed on Aug. 1, 2018, in the United States Patent and Trademark Office, and all the benefits accruing therefrom under 35 U.S.C. § 119, the content of which is incorporated herein in its entirety by reference.

BACKGROUND

1. Field

Disclosed is a solid-state lithium-ion conductor, a method of making the solid-state lithium-ion conductor, and a lithium battery including the same.

2. Description of the Related Art

A battery including a solid-state electrolyte can potentially offer improved safety, and in some configurations provide improved specific energy and energy density. Garnet-type oxides can provide promising lithium-ion conductivity. It would thus be desirable to use a garnet-type oxide electrolyte in a solid-state lithium-ion battery. However, there remains a need for a scalable method to manufacture a garnet-type electrolyte in a suitable form which also provides suitable lithium-ion conductivity.

SUMMARY

Disclosed is a method of manufacturing a solid-state electrolyte including: providing a solvent; dissolving a precursor compound including lithium, a precursor compound including lanthanum, and a precursor compound including zirconium in the solvent to provide a precursor composition, wherein a content of lithium in the precursor composition is greater than a stoichiometric amount; spraying the precursor composition onto a heated substrate to form a film; and heat-treating the film at 300° C. to 800° C. to manufacture the solid-state electrolyte, wherein the solid-state electrolyte includes $Li_{(7-x)}Al_{x/3}La_3Zr_2O_{12}$ wherein $0 \leq x \leq 1$, wherein the solid state electrolyte is in a form a film having a thickness of 5 nanometers to 1000 micrometers.

Also disclosed is a solid-state electrolyte film including cubic $Li_{(7-x)}Al_{x/3}La_3Zr_2O_{12}$ wherein $0 \leq x \leq 1$, wherein a thickness of the film is 5 nanometers to 1000 micrometers.

Also disclosed is a lithium battery including the solid-state electrolyte in at least one of a positive electrode, a separator, or a negative electrode.

The above described and other features are exemplified by the following figures and detailed description.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Lithium lanthanum zirconium oxide (LLZO) garnet-type solid-state electrolytes are currently synthesized by either bulk-type methods, e.g., sintering a pressed pellet, or sintering a compressed tape. The products of the bulk-type methods can have desirable conductivity, however the processing temperatures, while suitable for laboratory setting, exceed those desirable for a manufacturing environment, and films of a solid-state electrolyte produced by bulk-type methods are relatively thick, resulting in undesirably low conductivity. Alternatively, methods to provide thin-films of LLZO by vacuum techniques are known, however such methods are economically unsuitable for scalable production.

Disclosed is a method of manufacturing a solid-state electrolyte comprising: providing a solvent; dissolving a compound comprising lithium, a compound comprising lanthanum, and a compound comprising zirconium in the solvent to provide a solution, wherein a content of the lithium compound is greater than a stoichiometric amount; spraying the solution onto a heated substrate to form a film; and heat-treating the film at 300° C. to 800° C. to manufacture the solid state electrolyte, wherein the solid-state electrolyte comprises $Li_{(7-x)}Al_{x/3}La_3Zr_2O_{12}$ wherein $0 \leq x \leq 1$, and wherein the solid state electrolyte is in a form a film having a thickness of 5 nanometers to 1000 micrometers. The disclosed method provides films having a selected thickness, desirable conductivity, and selective surface morphology. Also, the disclosed method is scalable and can have a cost which is suitable for a manufacturing environment.

Figure 1:
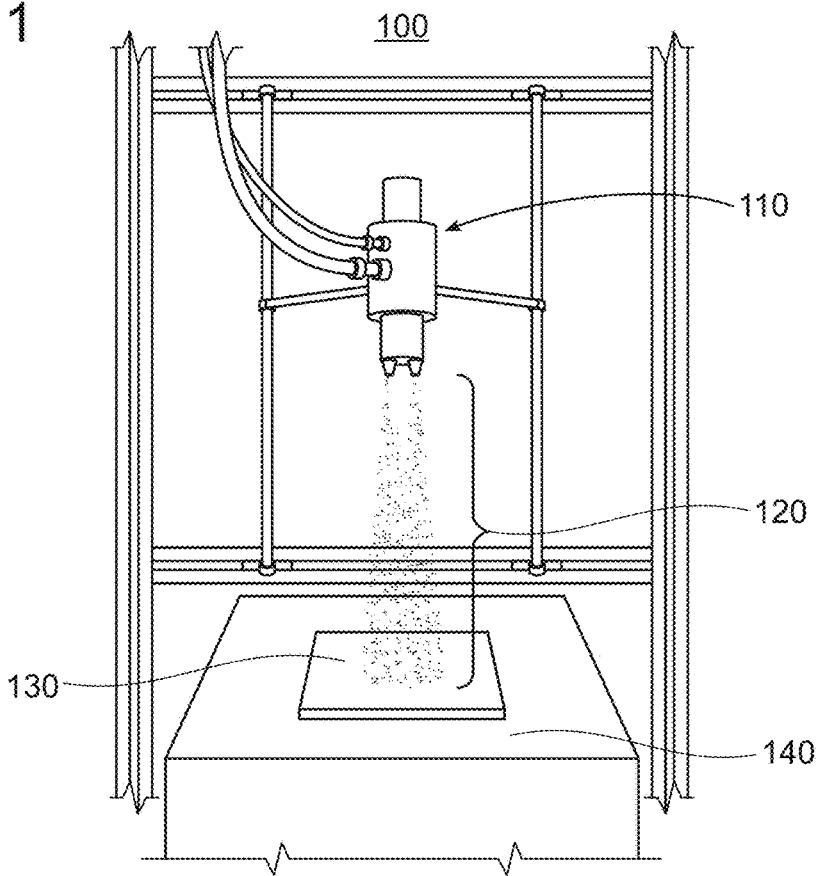
FIG. 1 is a schematic diagram of an apparatus for manufacturing a solid-state electrolyte by spray pyrolysis.

A schematic diagram of an apparatus 100 for the disclosed method is shown in FIG. 1. The disclosed apparatus includes an atomizer 110 for atomizing a composition for forming the solid-electrolyte, a droplet transport region 120 between the atomizer and a substrate 130, and a heated surface 140 beneath the substrate.

The composition for forming the solid-state electrolyte may be a solution, a suspension, or a combination thereof of the precursor in the solvent. In an embodiment, the composition is a solution of the precursor in the solvent.

The solvent may comprise a substituted or unsubstituted C1 to C20 alcohol, a substituted or unsubstituted C1 to C20 ester, a substituted or unsubstituted C2 to C20 carbonate, a substituted or unsubstituted C1 to C20 ketone, or a combination thereof.

Use of a substituted or unsubstituted alcohol, a substituted or unsubstituted ester, a substituted or unsubstituted carbonate, a substituted or unsubstituted ketone, or a combination thereof is mentioned. In an embodiment, the solvent comprises a substituted or unsubstituted C1 to C6 alcohol, a substituted or unsubstituted phthalate, or a combination thereof. Use of a substituted alcohol, e.g., methoxy propanol, and a phthalate are mentioned. In an embodiment, disclosed is a composition for forming the solid-state electrolyte comprising a solution of the starting materials in methanol, 1-methoxy-2-propanol, and bis(2-ethylhexyl) phthalate.

Mentioned is an embodiment in which the solvent comprises a C1 to C2 alcohol, e.g., methanol, a C3 to C5 alcohol, e.g., 1-methyl-2-propanol, and a phthalate, e.g., bis(2-ethylhexyl)phthalate. The C1 to C2 alcohol, the C3 to C5 alcohol, and the phthalate may be combined in any suitable ratio. A content of the C1 to C2 alcohol, the C3 to C5 alcohol, and the phthalate may be independently selected and each may be 1 to 99 volume percent (vol %), 2 to 98 vol %, 4 to 92 vol %, or 8 to 75 vol %, based on a total volume of the solvent. An embodiment in which equal volumes of the C1 to C2 alcohol, the C3 to C5 alcohol, and the phthalate are used as mentioned.

A boiling point of the solvent can be 0° C. to 350° C., 5° C. to 325° C., 10° C. to 300° C., or 20° C. to 250° C. In an embodiment, the solvent has a boiling point between 80° C. and 240° C.

The precursor of the solid-state electrolyte comprises a compound comprising lithium, a compound comprising lanthanum, and a compound comprising zirconium, and the solvent. The solvent may dissolve the compound comprising lithium, the compound comprising lanthanum, and the compound comprising zirconium to provide a solution, wherein a content of the lithium compound is greater than a stoichiometric amount. Also, the precursor may further comprise a compound comprising aluminum. Also a suspension is disclosed. In an embodiment, at least one of the compound comprising lithium, the compound comprising lanthanum, and the compound comprising zirconium is not fully dissolved in the solvent to provide a suspension.

Suitable compounds for the precursor include an oxide, hydroxide, nitrate, carbonate, oxalate, peroxide, acetate, acetylacetonate, or a combination thereof. The precursor may comprise lithium, lanthanum, zirconium, and optionally aluminum. In an embodiment, the precursor comprises a plurality of lithium, lanthanum, zirconium, and optionally aluminum.

Representative precursor compounds comprising lithium include lithium oxide, lithium hydroxide, lithium nitrate, lithium carbonate, lithium oxalate, lithium peroxide, lithium acetate, lithium acetoacetate, or a combination thereof.

Representative precursor compounds comprising lanthanum include lanthanum oxide, lanthanum hydroxide, lanthanum nitrate, lanthanum carbonate, lanthanum oxalate, lanthanum peroxide, lanthanum acetate, lanthanum acetoacetate, or a combination thereof.

Representative precursor compounds comprising zirconium include zirconium oxide, zirconium hydroxide, zirconium nitrate, zirconium carbonate, zirconium oxalate, zirconium peroxide, zirconium acetate, zirconium acetoacetate, or a combination thereof.

Representative precursor compounds comprising aluminum include aluminum oxide, aluminum hydroxide, aluminum nitrate, aluminum carbonate, aluminum oxalate, aluminum peroxide, aluminum acetate, aluminum acetoacetate, or a combination thereof.

Also disclosed are precursor compounds that provide a combination of lithium, lanthanum, or zirconium, and optionally aluminum.

If desired, the precursor may be a hydrate. For example, use of $La(NO_3)_3 \cdot 6H_2O$ or $Al(NO_3)_3 \cdot 9H_2O$ is mentioned.

The concentration of the precursor compound in the solvent may be a concentration which is suitable for spray pyrolysis. In an embodiment, the concentration of the precursor compound in the solvent is 0.001 to 1 molar (M), 0.01 to 0.5 M, or 0.05 to 0.1 M. Use of a precursor concentration of 0.01 to 0.05 M is mentioned.

The precursor composition may comprise a stoichiometric excess of the compound comprising lithium, based on a stoichiometry for $Li_{(7-x)}Al_{x/3}La_3Zr_2O_{12}$ wherein $0 \leq x \leq 1$. The stoichiometric excess of the compound comprising lithium may be 10% to 300%, 20% to 250%, or 40% to 200%, based on a stoichiometry for $Li_{(7-x)}Al_{x/3}La_3Zr_2O_{12}$ wherein $0 \leq x \leq 1$. Use of a stoichiometric of 150% for the compound comprising lithium in the precursor composition is mentioned.

In the disclosed method, the precursor composition is disposed onto a heated substrate. The disposing may comprise atomizing the precursor composition, and spraying the resulting fluid onto the heated substrate. The spraying may comprise disposing 1 to 100 milliliter (mL), 5 to 50 mL, or 10 to 25 mL of the precursor composition onto the heated substrate per square centimeter of heated substrate per hour.

The substrate may comprise any suitable material. A substrate comprising magnesia, alumina, silica, indium tin oxide, zinc oxide, indium tin zinc oxide, SiC, Ti, Ni, stainless steel, or combination thereof is disclosed. Use of a substrate comprising MgO is mentioned.

A temperature of the heated substrate may be 300° C. to 800° C., 350° C. to 750° C., 400° C. to 700° C., or 450° C. to 650° C. Use of a substrate heated to 600° C. is mentioned.

The substrate may be heated by any suitable method including convection heating, infrared heating, or a combination thereof.

In the disclosed method, a film comprising $Li_{(7-x)}Al_{x/3}La_3Zr_2O_{12}$ wherein $0 \leq x \leq 1$ and having a thickness of 5 nanometers (nm) to 1000 micrometers (μm) is formed on the heated substrate. The thickness of the film may be 10 nm to 100 μm, 20 nm to 10 μm, or 0.1 μm to 1 μm.

The film may be heat-treated at a temperature of 300° C. to 800° C., 350° C. to 750° C., 400° C. to 700° C., or 450° C. to 650° C. Heat-treating at 750° C. is mentioned.

An atmosphere of the heat treating may comprise nitrogen, argon, helium, hydrogen, or a combination thereof, and may be a reducing atmosphere comprising hydrogen, or an oxidizing atmosphere comprising oxygen, e.g., air. In an embodiment, the heat-treating is conducted in an atmosphere having a content of oxygen which is greater than that of air.

The film comprising $Li_{(7-x)}Al_{x/3}La_3Zr_2O_{12}$ may have a desirable surface roughness. A surface roughness (Ra) of the solid-state electrolyte may be 0.1 to 50 μm, 0.5 to 25 μm, or 1 to 10 μm. Surface roughness can be measured using a commercially available surface profilometer.

Cubic, tetragonal, and amorphous $Li_{(7-x)}Al_{x/3}La_3Zr_2O_{12}$ can be provided by the disclosed method. Because cubic $Li_{(7-x)}Al_{x/3}La_3Zr_2O_{12}$ provides improved ionic conductivity, cubic $Li_{(7-x)}Al_{x/3}La_3Zr_2O_{12}$ is for many applications desirable. In an embodiment, a content of the cubic $Li_{(7-x)}$ $Al_{x/3}La_3Zr_2O_{12}$ is 50 to 100 weight percent (wt %), a content of the tetragonal $Li_{(7-x)}Al_{x/3}La_3Zr_2O_{12}$ is 0 to 50 wt %, and a content of the amorphous $Li_{(7-x)}Al_{x/3}La_3Zr_2O_{12}$ is 0 to 100 wt %, each based on a total content of the solid-state electrolyte. In an embodiment, a content of the cubic $Li_{(7-x)}Al_{x/3}La_3Zr_2O_{12}$ is 60 to 99 wt %, a content of the tetragonal $Li_{(7-x)}Al_{x/3}La_3Zr_2O_{12}$ is 1 to 50 wt %, and a content of the amorphous $Li_{(7-x)}Al_{x/3}La_3Zr_2O_{12}$ is 1 to 99 wt %, each based on a total content of the solid-state electrolyte. In yet another embodiment, a content of the cubic $Li_{(7-x)}Al_{x/3}La_3Zr_2O_{12}$ is 70 to 95 wt %, a content of the tetragonal $Li_{(7-x)}Al_{x/3}La_3Zr_2O_{12}$ is 0 to 50 wt %, and a content of the amorphous $Li_{(7-x)}Al_{x/3}La_3Zr_2O_{12}$ is 10 to 30 wt %, each based on a total content of the solid-state electrolyte. An embodiment in which a content of the cubic $Li_{(7-x)}Al_{x/3}La_3Zr_2O_{12}$ in the solid-state electrolyte is 80 to 100 wt %, based on a total weight of the solid-state electrolyte, is mentioned.

The solid-state electrolyte may have a porosity of 0 to 10%, 0.1 to 8%, or 0.2 to 4%, based on a total volume of the solid-state electrolyte. Embodiment in which the porosity is 0 to 0.2%, based on a total volume of the solid-state electrolyte is mentioned. The porosity may be determined by scanning electron microscopy, the details of which can be determined by one of skill in the art without undue experimentation.

A feature of the disclosed method is that it provides solid-state electrolyte films having unexpectedly reduced or effectively no defect content. A defect content of the film can be 0 to 5 percent (%), 0.01 to 3%, or 0.1 to 1%, based on a total area of the film. A defect content may be determined by illuminating light through a film and determining an area of the film that does not contain the solid-state electrolyte. Alternatively, the defect content can be determined by scanning electron microscopy (SEM).

Figure 6:
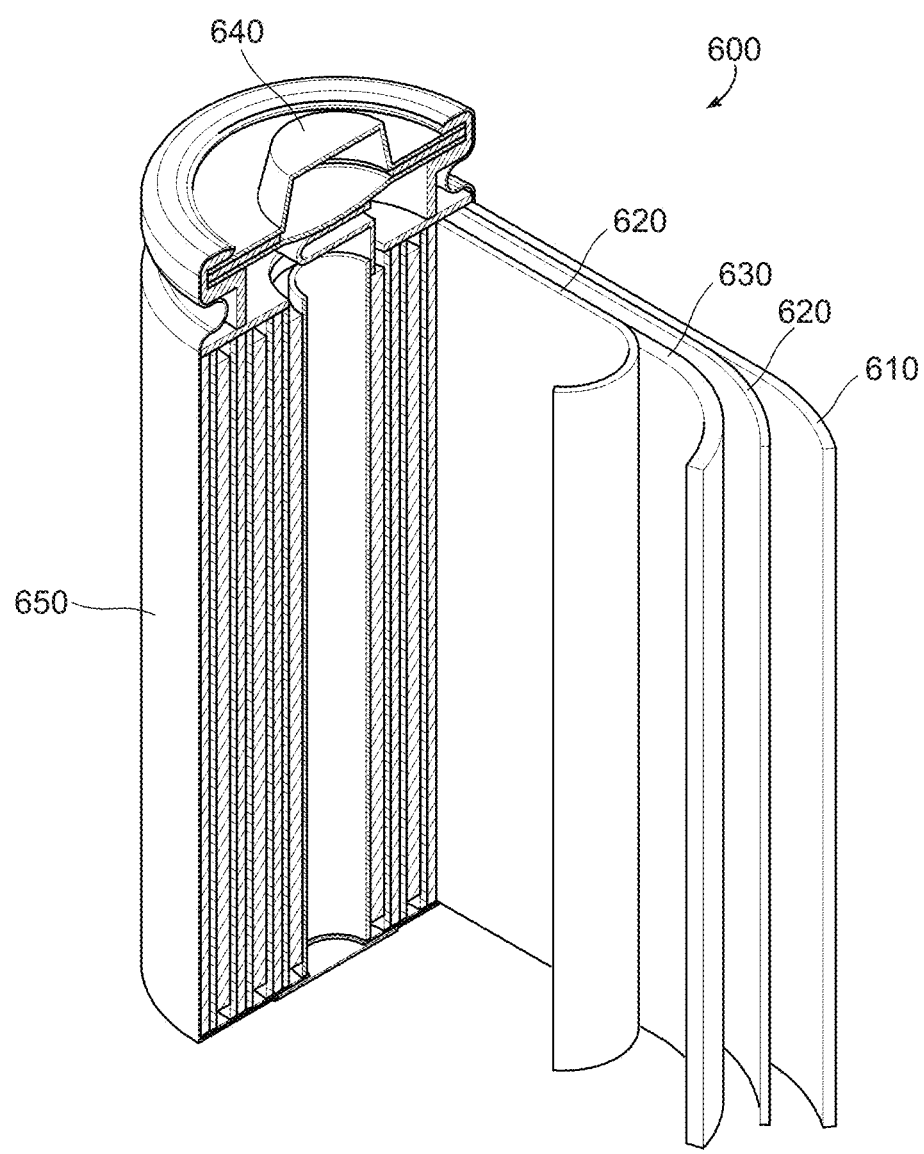
FIG. 6 is a schematic diagram of an embodiment of an electrochemical cell.

Also disclosed is a lithium battery comprising the solid-state electrolyte in at least one of a positive electrode, a separator, or a negative electrode. As shown in the electrochemical cell 600 of FIG. 6, the negative electrode 610 can be used in combination with a positive electrode 630 comprising the positive active material and a separator 620, e.g., a separator comprising the solid-state electrolyte, provided between the positive electrode and the negative electrode. Also shown in FIG. 6 is a header 640 on a can 650.

Figure 7:
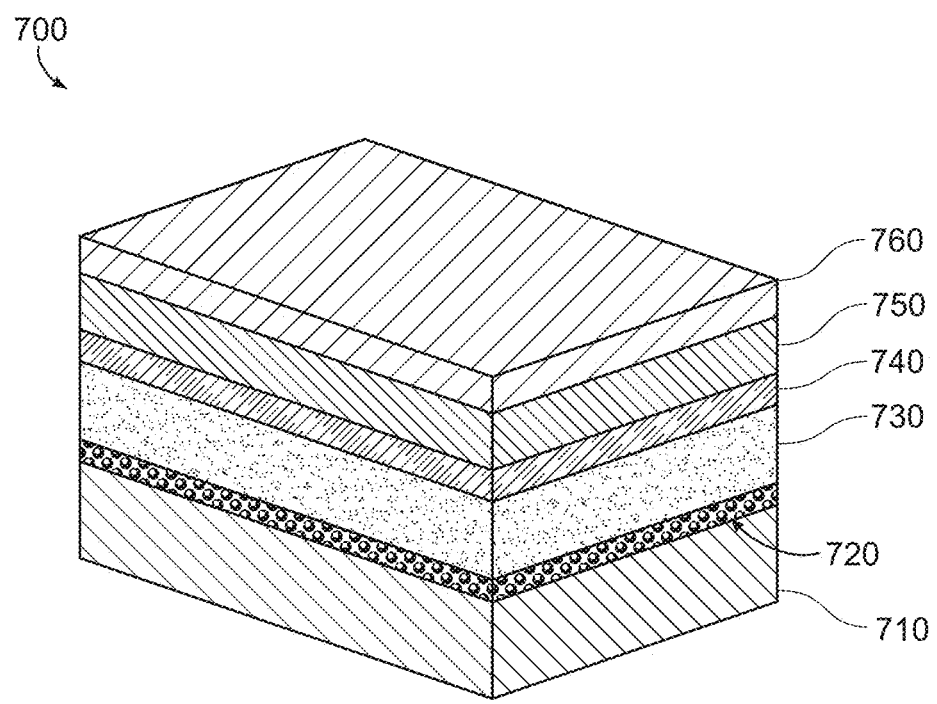
FIG. 7 is a schematic diagram of another embodiment of an electrochemical cell.

In another embodiment as shown in FIG. 7, an electrochemical cell 700 may comprise a porous separator on the solid-state electrolyte. Shown in FIG. 7 is a positive electrode current collector 710, a positive electrode 720 comprising a positive electrode active material and a liquid electrolyte, a porous separator 730, the solid-state electrolyte 740, a negative electrode 750, and a negative electrode current collector 760.

The positive electrode can be prepared by forming a positive active material layer including a positive active material on a current collector. The current collector may comprise aluminum, for example.

The positive active material can comprise a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \leq a \leq 1.8$ and $0 \leq b \leq 0.5$; $Li_aE_{1-b}M_bO_{2-c}D_c$ wherein $0.90 \leq a \leq 1.8$, $0 \leq b \leq 0.5$, and $0 \leq c \leq 0.05$; $LiE_{2-b}M_bO_{4-c}D_c$ wherein $0 \leq b \leq 0.5$ and $0 \leq c \leq 0.05$; $Li_aNi_{1-b-c}Co_bM_cD_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bM_cO_{2-\alpha}X_2$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cD_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 \leq \alpha \leq 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where $0<x<1$, $LiNi_{1-x-y}Co_xMn_yO_2$ where $0 \leq x \leq 0.5$ and $0 \leq y < 0.5$, $LiFePO_4$, $TiS_2$, $FeS_2$, $TiS_3$, and $FeS_3$.

The positive active material layer may further include a conductive agent and a binder. Any suitable conductive agent and binder may be used.

A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The positive active material layer may be prepared by a solid-state method such as screen printing, slurry casting, or powder compression. However, the solid-state method is not limited thereto, and any suitable method may be used. The current collector may comprise aluminum, for example.

The positive electrode can further comprise an electrolyte. When present, the electrolyte can comprise a solid-state electrolyte, a liquid electrolyte, a polymeric electrolyte, or a combination thereof. The liquid electrolyte may comprise a lithium salt and a solvent. Representative lithium salts include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, $NaAsF_6$, or a combination thereof. The solvent may comprise a carbonate, an ester, an ether, a ketone, an alcohol, or a combination thereof. The carbonate may be linear or cyclic, and may be fluorinated. Representative carbonates include at least one selected from diethyl carbonate ("DEC"), dimethyl carbonate ("DMC"), dipropyl carbonate ("DPC"), methyl propyl carbonate ("MPC"), ethyl propyl carbonate ("EPC"), methyl ethyl carbonate ("MEC"), or a combination thereof, and the cyclic carbonate compound may be, for example, ethylene carbonate ("EC"), propylene carbonate ("PC"), butylene carbonate ("BC"), vinyl ethylene carbonate ("VEC"), fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methyl ethyl ene carbonate, 4,5-difluoro-4-methyl ethylene carbonate, 4,4,5-trifluoro-5-methylethylene carbonate, and trifluoromethyl ethylene carbonate. Representative esters include at least one selected from methyl acetate, ethyl acetate, n-propyl acetate, dimethyl acetate, methyl propionate, ethyl propionate, γ-butyrolactone, decanolide, valerolactone, mevalonolactone, caprolactone, and methyl formate. Representative ethers include at least one selected from dibutyl ether, tetraglyme, diglyme, 1,2-dimethoxy ethane, 1,2-diethoxy ethane, ethoxy methoxy ethane, 2-methyl tetrahydrofuran, and tetrahydrofuran. A representative ketone is cyclohexanone. Representative alcohols include methanol, ethanol, isopropanol, and butanol. The solvent may comprise a nitrile, such as a C1 to C20 nitrile; an amide such as formamide or dimethyl formamide; a dioxolane such as 1,2-dioxolane or 1,3-dioxolane; a sulfolane such as dimethyl sulfoxide, sulfolane, or methyl sulfolane; 1,3-dimethyl-2-imidazolinone; N-methyl-2-pyrrolidinone; nitromethane; trimethyl phosphate; triethyl phosphate; trioctyl phosphate; or triester phosphate. A concentration of the salt in the solvent may be 0.1 to 2 molar (M), e.g., 0.5 to 1.5 M.

The polymeric electrolyte may comprise an ionically conductive polymer. Exemplary ionically conductive polymers can include but are not limited to polyethylene oxide, polyethylene oxide comprising a metal salt, poly(methyl (meth)acrylate), polypropylene oxide, polyvinylidene fluoride, polystyrene, polyvinyl chloride, polyvinyl alcohol, polyacrylonitrile, polyester sulfide, or a combination thereof. The ionically conductive polymer can optionally further comprise a lithium salt, for example $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or a combination thereof. In some embodiments, the ionically conductive polymer comprises the lithium salt, and is preferably a polyethylene oxide comprising the lithium salt.

The separator may be included between the positive electrode and negative electrode. In an embodiment the separator consists of the solid-state electrolyte. In an embodiment the separator comprises a glass fiber, polyester, polyethylene, polypropylene, polytetrafluoroethylene (PTFE), or a combination thereof. In an embodiment the separator may comprise a microporous polymeric film, such as a microporous polyethylene or microporous polypropylene film. In an embodiment the separator comprises the solid-state electrolyte and a porous olefin film such as polyethylene and polypropylene. A diameter of a pore of the porous olefin film can be 0.01 to 10 micrometers (μm), and a thickness of the separator can be in a range of 5 to 300 μm.

In an embodiment, provided is a porous separator on the solid-state electrolyte. For example, the electrochemical cell may comprise a porous separator 720 comprising a microporous polyethylene film having a pore size of 1 to 50 μm, 2 to 40 μm, or 5 to 30 μm, and a layer of the solid-state electrolyte on the porous separator. The solid-state electrolyte may be liquid-impermeable, may be non-porous, or may have a pore size of 0.01 to 1 μm, 0.05 to 0.5 μm.

The negative electrode can be produced from a negative active material composition including a negative active material, and optionally, a conductive agent, and a binder. A suitable negative active material includes a material capable of storing and releasing lithium ions electrochemically. Such negative electrode active material can a carbon, such as a hard carbon, soft carbon, carbon black, ketjen black, acetylene black, activated carbon, carbon nanotubes, carbon fiber, graphite, or an amorphous carbon. Also usable are lithium-containing metals and alloys, for example a lithium alloy comprising Si, Sn, Sb, Ge, or a combination thereof. Lithium-containing metal oxides, metal nitrides, and metal sulfides are also useful, in particular wherein metal can be Ti, Mo, Sn, Fe, Sb, Co, V, or a combination thereof. Also useable are phosphorous (P) or metal doped phosphorous (e.g., $NiP_3$). The negative active material is not limited to the foregoing and any suitable negative active material can be used. In an embodiment the negative active material is disposed on a current collector, such as copper current collector.

In an embodiment, the negative electrode comprises graphite. In an embodiment, the negative electrode comprises lithium metal or a lithium metal alloy. Use of lithium metal is mentioned.

The electrochemical cell can be made by a method comprising disposing the solid-state electrolyte film between a positive electrode and a negative electrode and inserting the assembly into a can, for example, to provide the electrochemical cell.

EXAMPLE

Materials: reagents were used as received without further purification. $LiNO_3$ (≥99%), Zirconium(IV) acetylacetonate (97%), and 1-methoxy-2-propanol (≥99.5%) were purchased from SIGMA-ALDRICH; $Al(NO_3)_3.9H_2O$, $La(NO_3)_3.6H_2O$ (99.99%), and bis(2-ethylhexyl) phthalate were purchased from ALFA AESAR; Methanol was purchased from VWR INTERNATIONAL. Polished MgO (100) substrates (10×10×0.5 mm) were purchased from MTI CORPORATION.

Synthesis of precursor solutions: precursor solutions were prepared by dissolving stoichiometric ratios of La, Al, and Zr salts and a 150% stoichiometric excess of the Li salt in a methanol:1-methoxy-2-propanol:bis(2-ethylhexyl) phthalate (33:33:33 vol %) solution. The precursor solutions were stirred overnight for at least 12 hours.

Manufacture of thin films of solid-state electrolytes: the precursor solutions were loaded into a polypropylene syringe and pumped at 5 to 30 mL/hour into a spray gun (DEVILBLISS AG361). The spray gun used compressed air as a carrier gas with a pressure at the atomizer of 0.3 kPa. MgO substrates were placed on a heated stainless steel hot plate. The substrate temperature ranged from 270 to 330° C., and the distance between the MgO substrate and the atomizer was approximately 24 cm.

Characterization: the solid-state electrolyte films were analyzed using scanning electron microscopy (SEM) on a ZEISS Supra55VP field emission scanning electron microscope operated between 3.0 to 10.0 kV using both the In-lens SE and the Everhart-Thornley SE detectors. The solid-state electrolyte films were cross sectioned with a diamond blade and attached to a sample stage via carbon-conductive tape.

X-ray diffraction (XRD) was performed using a PANalytical X'pert Pro Powder Diffractometer with Cu Kα radiation ($\lambda$=1.54056 Å).

X-ray photoelectron spectroscopy (XPS) spectra were collected using a THERMO K-Alpha XPS system with a spot size of 400 μm and a resolution of 0.1 eV.

Raman spectroscopy analysis was completed using a WITec spectrometer with a spectral resolution of 0.7 cm$^{-1}$ at 10 mW and a wavelength of 532 nm to ensure low penetration depths.

Figure 2A:
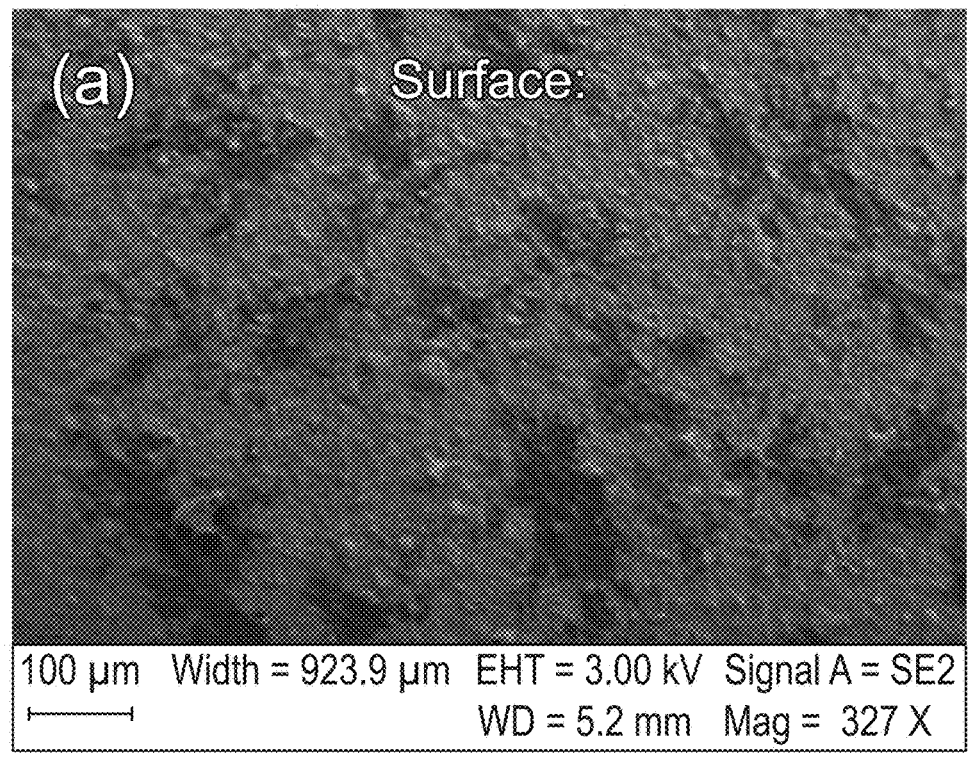
FIGS. 2A and 2B are scanning electron micrographs of a surface of a solid-state electrolyte manufactured in the Example.
Figure 2B:
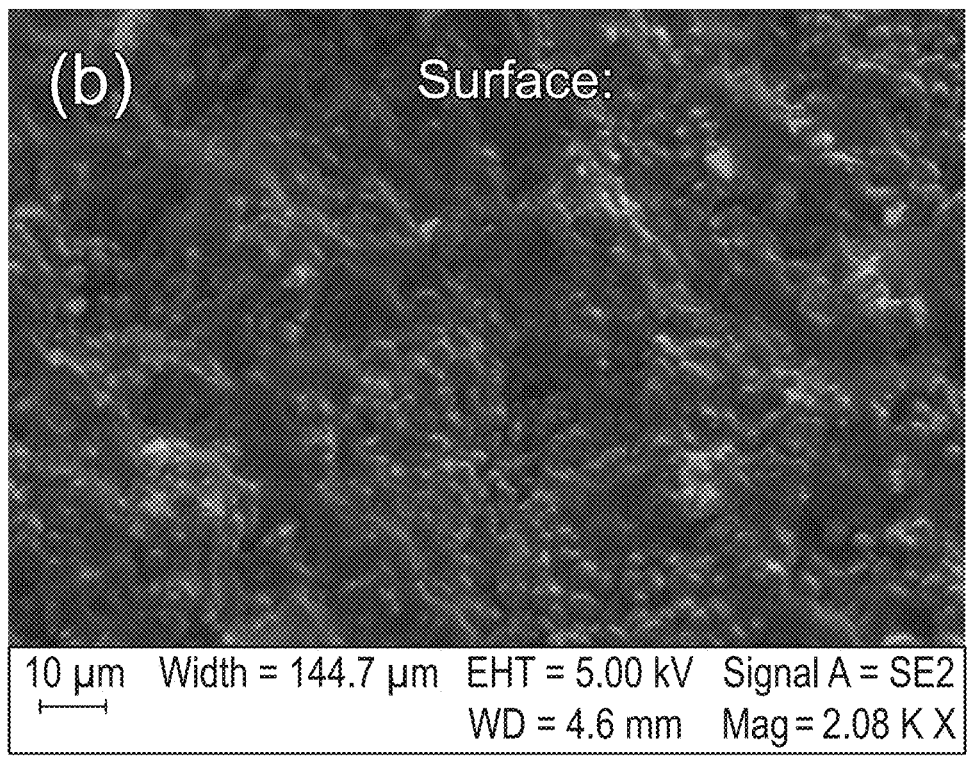
Figure 2C:
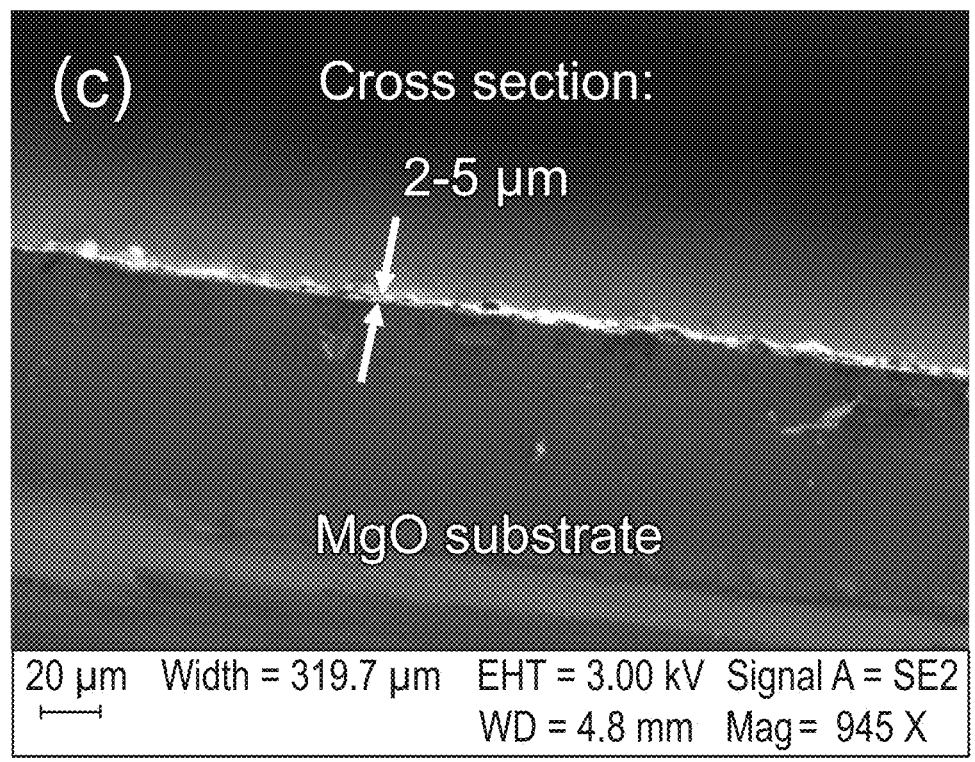
FIGS. 2C and 2D are scanning electron micrographs showing the results of cross-section analysis of the films of FIGS. 2A and 2B.
Figure 2D:
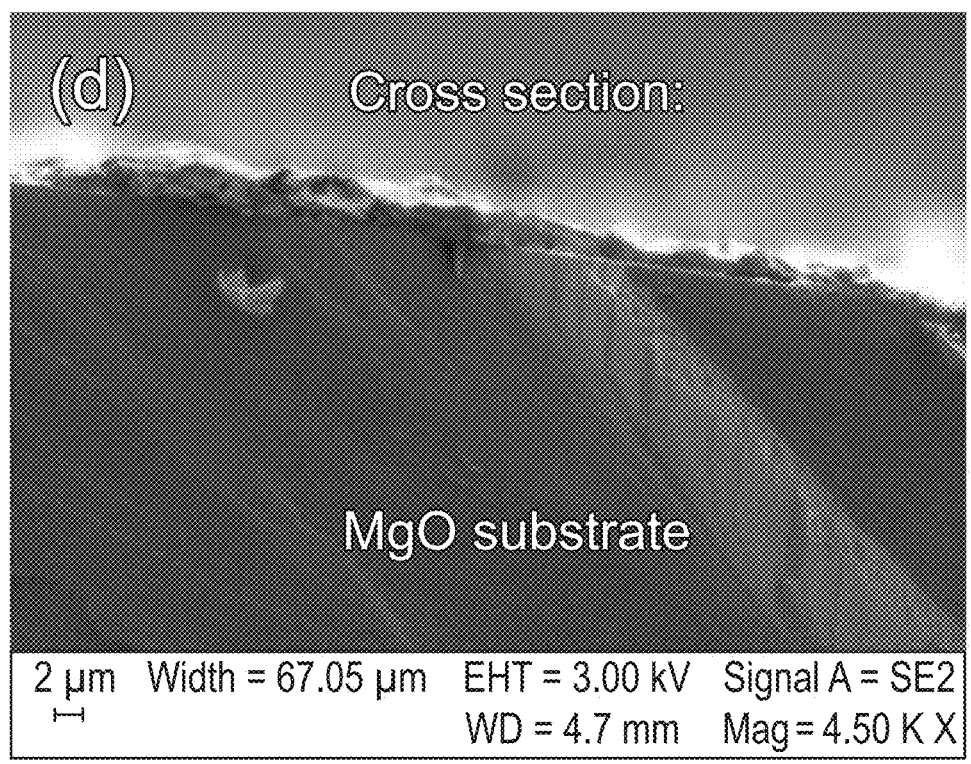

Shown in FIGS. 2A and 2B are results of surface analysis of two films, and shown in FIGS. 2C and 2D, the results of cross-section analysis of the films of FIGS. 2A and 2B, respectively, wherein each film comprises $Li_{6.25}Al_{0.25}La_3Zr_2O_{12}$, and each was prepared using an injection rate of 10 milliliters per hour of a 0.03 M precursor solution onto a 1 cm$^2$ MgO substrate, prior to annealing at 800° C. for 30 minutes under a flow of oxygen. As shown in the cross-section images, films have a thickness of 2-5 μm.

Figure 3:
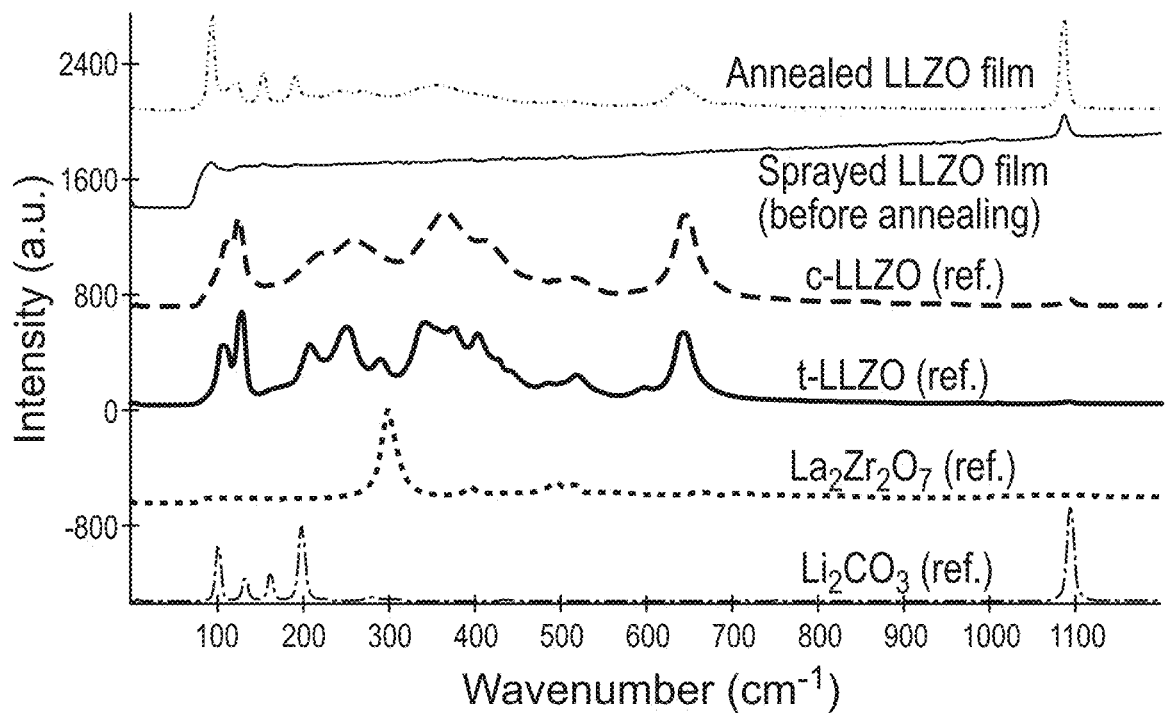
FIG. 3 is a graph of intensity (arbitrary units, a.u.) versus wavenumber (inverse centimeters, $cm^{-1}$) showing the results of Raman analysis of the solid-state electrolyte of the Example before and after annealing, and for reference Raman spectra of cubic lithium lanthanum zirconium oxide (c-LLZO), tetragonal lithium lanthanum zirconium oxide (t-LLZO), $La_2Zr_2O_7$ and $Li_2CO_3$.
Figure 4:
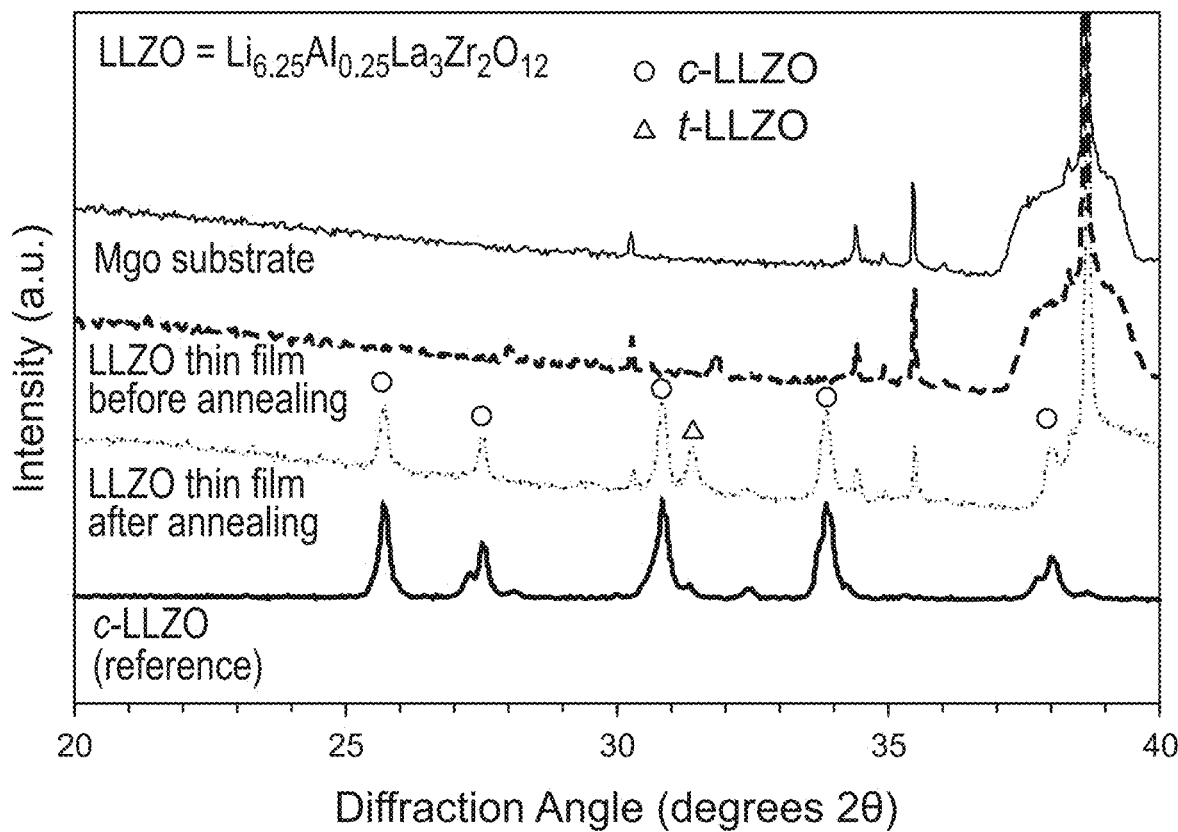
FIG. 4 is a graph of intensity (arbitrary units, a.u.) versus diffraction angle (degrees two-theta, $2\theta$) showing the results of X-ray diffraction analysis of the solid-state electrolyte of the Example before and after annealing, and for reference the MgO substrate and c-LLZO.

Shown in FIG. 3 are the results of the Raman analysis after annealing (top result), before annealing, and reference spectra for cubic and tetragonal $Li_{6.25}Al_{0.25}La_3Zr_2O_{12}$, $La_2Zr_2O_7$, and $LiCO_3$. As shown in FIG. 3, $Li_{6.25}Al_{0.25}La_3Zr_2O_{12}$ was observed only after annealing. Also, shown in FIG. 4 are the results of X-ray powder diffraction analysis before and after annealing, as well as result for the MgO substrate and cubic $Li_{6.25}Al_{0.25}La_3Zr_2O_{12}$. CuK$_\alpha$ radiation was used. As shown in FIGS. 3 and 4, annealing resulted in in conversion of tetragonal to cubic $Li_{6.25}Al_{0.25}La_3Zr_2O_{12}$.

Figure 5:
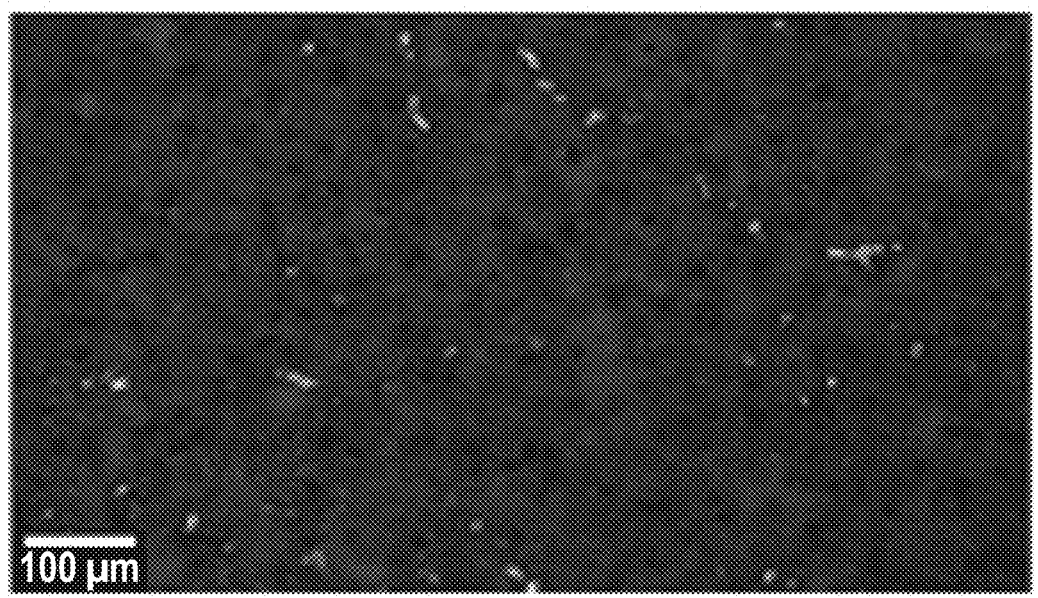
FIG. 5 is an optical photograph of the solid-state electrolyte of the Example showing pin-holes in the film.

Shown in FIG. 5 is an optical image of the $Li_{6.25}Al_{0.25}La_3Zr_2O_{12}$ solid-state electrolyte. As shown in FIG. 5, few defects are observed.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Substituted" means that the compound is substituted with at least one (e.g., 1, 2, 3, or 4) substituent, and the substituents are independently a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (=N—NH$_2$), a carbonyl (—C(=O)—), a carbamoyl group (—C(O)NH$_2$), a sulfonyl (—S(=O)$_2$—), a thiol (—SH), a thiocyano (—SCN), a tosyl (CH₃C₆H₄SO₂—), a carboxylic acid (—C(=O)OH), a carboxylic $C_1$ to $C_6$ alkyl ester (—C(=O)OR wherein R is a C1 to C6 alkyl group), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, or a C3 to C12 heteroaryl instead of hydrogen, provided that the substituted atom's normal valence is not exceeded. The indicated number of carbon atoms for any group herein is exclusive of any substituents.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of manufacturing a solid-state electrolyte, the method comprising:
    dissolving a precursor compound comprising lithium, a precursor compound comprising lanthanum, and a precursor compound comprising zirconium in a solvent comprising a substituted or unsubstituted phthalate to provide a solution of the precursor compound, wherein a content of lithium in the solution of the precursor compound is greater than a stoichiometric amount;
    spraying the solution of the precursor compound onto a heated substrate to form a film; and
    heat-treating the film at 300° C. to 800° C. to manufacture the solid state electrolyte, wherein
    the precursor compound comprising zirconium comprises zirconium nitrate, zirconium carbonate, zirconium oxalate, zirconium peroxide, zirconium acetate, zirconium acetoacetate, or a combination thereof,
    the precursor compound comprising lanthanum comprises lanthanum nitrate, lanthanum carbonate, lanthanum oxalate, lanthanum peroxide, lanthanum acetate, lanthanum acetoacetate, or a combination thereof,
    the solid-state electrolyte comprises $Li_{(7-x)}Al_{x/3}La_3Zr_2O_{12}$ wherein 0≤x≤1, wherein the $Li_{(7-x)}Al_{x/3}La_3Zr_2O_{12}$ comprises cubic $Li_{(7-x)}Al_{x/3}La_3Zr_2O_{12}$, and a content of the cubic $Li_{(7-x)}Al_{x/3}La_3Zr_2O_{12}$ is 50 to 100 weight percent, based on a total weight of the solid state electrolyte, and
    wherein the solid state electrolyte is in a form a film having a thickness of 5 nanometers to 1000 micrometers.

2. The method of claim 1, wherein the solvent further comprises a substituted or unsubstituted alcohol, a substituted or unsubstituted ester different from the phthalate, a substituted or unsubstituted carbonate, a substituted or unsubstituted ketone, or a combination thereof.

3. The method of claim 2, wherein the solvent comprises a substituted or unsubstituted C1 to C6 alcohol, and the substituted or unsubstituted phthalate, and
    wherein the solvent has a boiling point of 0° C. to 350° C.

4. The method of claim 1, wherein a content of the compound comprising lithium in the solution of the precursor compound is a stoichiometric excess for the $Li_{(7-x)}Al_{x/3}La_3Zr_2O_{12}$ wherein 0≤x≤1.

5. The method of claim 4, wherein the stoichiometric excess is 50% to 200%.

6. The method of claim 1, wherein the dissolving further comprises dissolving an compound comprising aluminum with the compound comprising lithium, the compound comprising lanthanum, and the compound comprising zirconium in the solvent to provide the solution.

7. The method of claim 1, wherein the solid state electrolyte has a thickness of 0.1 to 10 micrometers.

8. The method of claim 1, wherein the substrate comprises MgO, $Al_2O_3$, $SiO_2$, or a combination thereof.

9. The method of claim 1, wherein the solid state electrolyte has a surface roughness of 0.1 to 50 micrometers.

10. The method of claim 1, wherein the solid state electrolyte comprises the cubic $Li_{(7-x)}Al_{x/3}La_3Zr_2O_{12}$, a tetragonal $Li_{(7-x)}Al_{x/3}La_3Zr_2O_{12}$, and an amorphous $Li_{(7-x)}Al_{x/3}La_3Zr_2O_{12}$, and
    wherein a content of the tetragonal $Li_{(7-x)}Al_{x/3}La_3Zr_2O_{12}$ is 0 to 50 weight percent, and a content of the amorphous $Li_{(7-x)}Al_{x/3}La_3Zr_2O_{12}$ is 0 to 100 weight percent, each based on a total content of the solid-state electrolyte.

11. The method of claim 1, wherein the solid state electrolyte has a porosity of 0 to 10%, when determined by scanning electron microscopy.

12. The method of claim 1, wherein the heated substrate has a temperature of 300° C. to 800° C.

13. The method of claim 1, wherein a concentration of the precursor compound in the solvent is 0.01 to 1 molar/liter.

14. A method of manufacturing a solid-state electrolyte, the method comprising:
    dissolving a precursor compound comprising lithium, a precursor compound comprising lanthanum, and a precursor compound comprising zirconium in a solvent to provide a precursor composition, wherein a content of lithium in the precursor composition is greater than a stoichiometric amount;
    spraying the precursor composition onto a heated substrate to form a film; and
    heat-treating the film to manufacture the solid state electrolyte,
    wherein
    the solvent comprises methanol, 1-methoxy-2-propanol, and bis(2-ethylhexyl)phthalate,
    the lithium compound comprises lithium nitrate,
    the compound comprising lanthanum comprises lanthanum nitrate,
    the compound comprising zirconium comprises $Zr(C_5H_7O_2)_4$,
    the dissolving further comprises dissolving aluminum nitrate, and
    wherein the heat-treating comprises heat-treating at 750° C. to 850° C. for 30 minutes in oxygen, and
    wherein the solid-state electrolyte comprises $Li_{(7-x)}Al_{x/3}La_3Zr_2O_{12}$ wherein 0≤x≤1, and the solid state electrolyte is in a form a film having a thickness of 1 to 10 micrometers.

15. The method of claim 14, wherein the $Li_{(7-x)}Al_{x/3}La_3Zr_2O_{12}$ comprises cubic $Li_{(7-x)}Al_{x/3}La_3Zr_2O_{12}$, and wherein a content of the cubic $Li_{(7-x)}Al_{x/3}La_3Zr_2O_{12}$ is 50 to 100 weight percent, based on a total weight of the solid state electrolyte.

* * * * *